Patented July 6, 1943

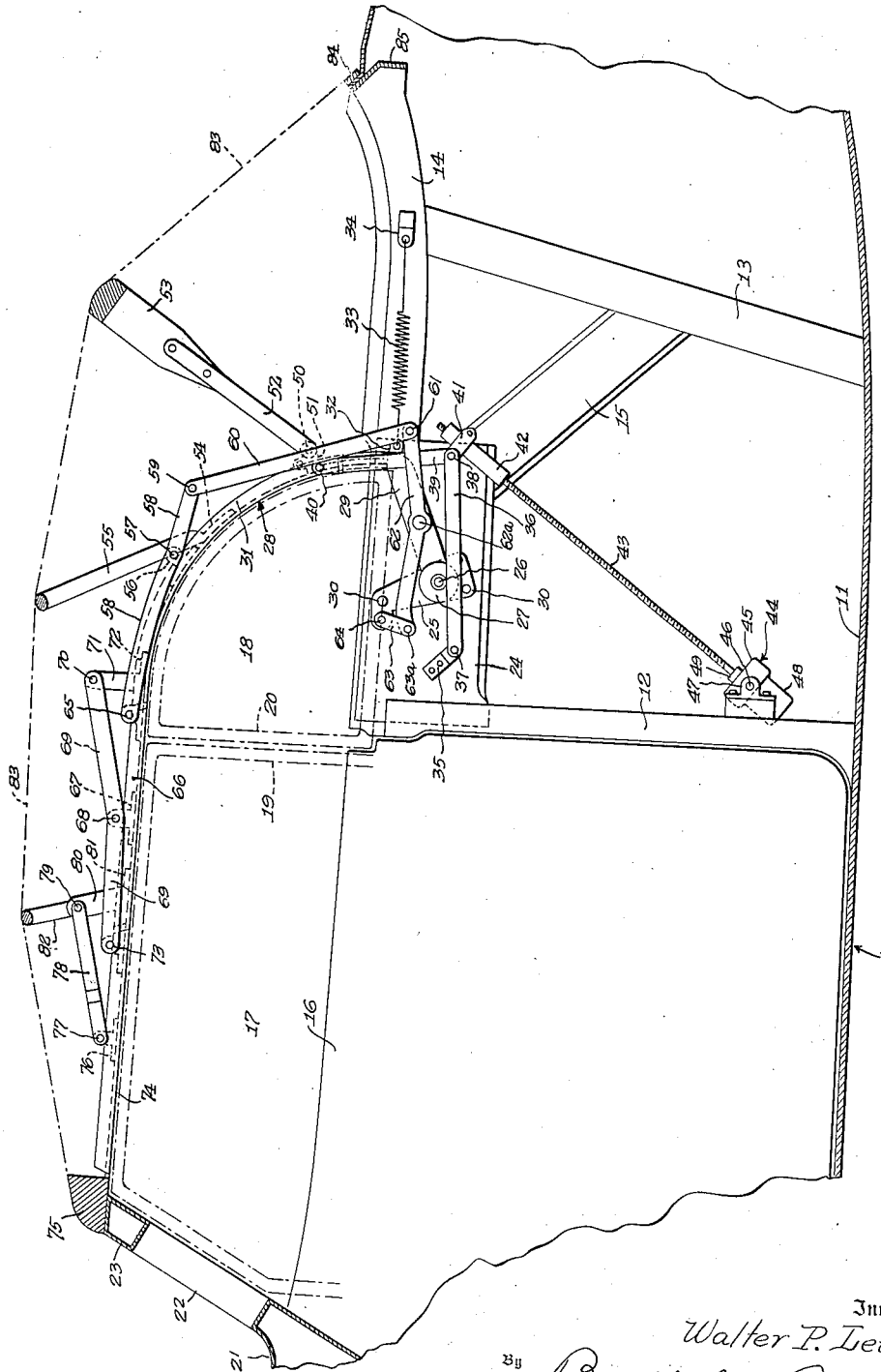

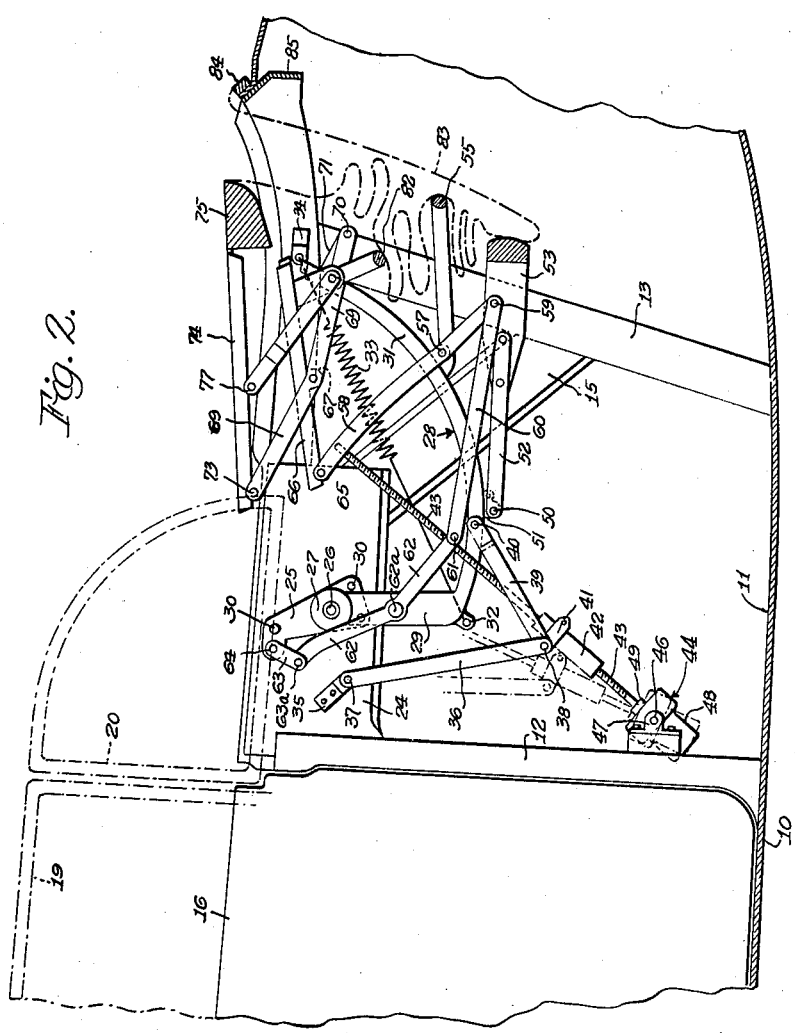

2,323,547

UNITED STATES PATENT OFFICE 2,323,547

FOLDABLE TOP STRUCTURE

Walter P. Levon, Detroit, Mich., assignor to F. L. Jacobs Company, Detroit, Mich., a corporation of Michigan Application February 6, 1942, Serial No. 429,783

10 Claims. (Cl. 296—117)

This invention relates to vehicle tops and, in particular to foldable tops for vehicles.

One object of this invention is to provide a foldable vehicle top which is particularly well adapted for power operation, and having means for applying the power in such a manner that the power is applied more directly and with greater mechanical advantage while the top is being lifted than hitherto.

Another object is to provide a foldable top structure having a main link or arm to which the power is applied through the agency of a toggle mechanism such that the power is applied with great force even when the top structure is in an oblique position relatively to the top lifting device.

Another object is to provide a foldable top structure as set forth in the preceding objects wherein the top is provided with C-shaped rear arms pivoted to the body and a power lifting device is connected thereto by means of a swinging power arm connected thereto by a link, so as to assert a powerful force upon the C-shaped arms even when the latter are in oblique positions relatively to the top lifting device.

In the drawings:

Figure 1 is a central longitudinal section through a vehicle body equipped with a foldable top according to a preferred embodiment of the present invention, with the top in its raised position.

Figure 2 is a view similar to Figure 1, but with the top in an almost fully lowered position.

In general, the foldable top of this invention consists of a series of links and levers combined with outriggers, the rear arms or C-shaped arms being pivoted to the vehicle body. A motor operated power lift is provided for the top and is pivoted to a convenient part of the body. The motor thereof rotates a screw shaft which engages a nut pivotally connected to an end of a pivoted arm which is connected to the rear or C-shaped arm by means of a pivoted link.

Referring to the drawings in detail, Figures 1 and 2 show a motor vehicle body, generally designated 10, having a floor 11 on the opposite sides of which are mounted body pillars 12 and rear body posts 13 connected thereto by the longitudinal body members 14 and by the inclined braces 15. The latter are of approximately channel cross section.

The vehicle body 10 is provided with front doors 16 having front window panes 17 slidable up and down from the interior of the doors 16. The body 10 is also provided with rear window panes 18 likewise slidable upward and downward therefrom. The window panes 17 and 18 are provided with edge frames 19 and 20 respectively, or they may optionally have plain edges. The body 10 is provided with a cowl 21 at the forward part thereof. From this cowl 21 rises a windshield 22 having an upper header 23. Behind the rear windows 18 is a compartment in the body 10 for receiving the top in its lowered position (Fig. 2).

Extending between the body pillars 12 and the inclined braces 15 are horizontal channel members 24 each carrying a bracket 25 serving as a support for a pivot pin or shaft 26. Pivotally mounted on the latter is the lower end 27 of a C-shaped rear arm 28. The latter has a lower portion 29 which is connected to the end 27. The bracket 25 is secured as at 30 to the channel member 24.

The C-shaped arm 28 is provided with a curved upper portion 31 integral with the lower portion 29 and provided with an ear 32 serving as a point of attachment for the forward end of a coil spring 33, the rearward end of which is anchored to a bracket 34 secured to the longitudinal body member 14.

Also pivotally mounted upon each channel member 24 is a bracket 35 to which is pivoted a swinging arm 36 as at the point 37. The opposite end of the swinging arm 36 is pivoted as at 38 to a link 39 which in turn is pivoted as at 40 to the upper portion 31 of the C-shaped or rear arm 38.

Likewise pivoted at 38 to the swinging arm 36 and link 39 is a collar 41 carried by a threaded nut 42 through which a rotatable threaded screw shaft 43 passes. This screw shaft 43 forms a part of a power lifting device generally designated 44 and having a casing 45 pivotally mounted as at 46 upon the bracket 47 secured to the body pillar 12 or to other convenient body members. The casing 45 contains a motor 48 connected through gearing (not shown) to the screw shaft 43, which emerges as at 49 from the casing 45.

Mounted on pivot pins 50 carried by ears 51 on the upper portions 31 of the C-shaped arms 28 are the lower portions 52 of the rear top cross bow 53. Higher up on the same member 31 is the curved lower end 54 rigidly secured thereto and forming a portion of the intermediate top cross bow 55. Adjacent the portion 44 is a bracket 56 serving as a support for a pivot pin 57 upon which a lever 58 is pivotally mounted intermediate its ends. The rearward end of the top lever 58 is pivoted as at 59 to a link 60 which in turn is pivoted as at 61 to a rocking arm 62 pivotally mounted as at 62a upon the lower portion 29 of the C-shaped arm 28. The forward end of the arm 62 is pivoted to a rocking link 63 at the point 63a. The rocking link 63 is pivoted to the bracket 25 at the point 64.

The forward end of the top lever 58 is pivoted as at 65 to the rearward end of the intermediate outrigger 66, the latter carrying an ear 67 with a pivot pin 68 serving as a fulcrum for the forward top lever 69. The rearward end of the forward top lever 69 is pivoted as at 70 to an upwardly extending post 71, the base 72 of which is rigidly mounted upon the upper end of the C-shaped rear arm 28 (Fig. 1).

The forward end of the forward lever 69 is pivoted as at 73 to the rearward end of the forward outrigger 74, the forward end of which carries the front top header 75. The forward outrigger 74 is provided with a bracket 76 carrying a pivot pin 77 to which is attached the forward end of a link 78, the rearward end of which is connected to the pivot pin 79 mounted upon the post 80 extending upward from the base portion 81 which in turn is secured to the forward end of the intermediate outrigger 67. Also pivotally on the pivot pin 79 is one end of the forward top cross bow 82. Carried by the cross bows 53, 55 and 82, and connected to the forward top header 75 is a flexible top covering 83 the rearward lower edge of which is secured as at 84 to the rear portion 85 interconnecting the longitudinal body members 14. The outriggers 74 and 66 and the upper portions 31 of the C-shaped rear arms 28 are preferably of channel cross section so as to increase their strength.

In the operation of the invention, let it be assumed that the top is in its lowered position, as shown approximately in Figure 2. In actuality the position of the top in Figure 2 is after it has been slightly raised so as to separate the parts and show their relationship more clearly.

When the top is in its fully lowered position, the power lifting device 44 occupies the dotted line position shown in Figure 2. When the motor 48 is energized, it rotates the screw shaft 43 and the nut 42 moves upward, swinging the arm 36 around its pivot 37 and applying a thrust to the upper portion 31 of the C-shaped arm 28 by way of the link 39.

As a consequence, the C-shaped arms 39 swing upward around their pivots 26, and at the same time the lever and link assembly 62, 60, 58, swings the intermediate outrigger 66 upward and forward. This motion is transmitted to the forward outrigger 74 by means of the lever 69 and link 78. While the power top lifting device 44 is operating in this manner, it swings around its pivots 46, which thus serve as trunnions.

In previous power lifted tops, it has been found that the power required to lift the top varies considerably as the top is being raised due to the fact that the screw shaft 43 changes its angle very considerably relatively to the C-shaped arm which it raises. Where the top lift has been directly attached to the arm 28, therefore, the load upon the motor 48 would vary enormously while the top was being raised. The present invention, by applying the power through the independent arm 36 and link 39 greatly reduces this disadvantage of prior tops. The auxiliary system of links and levers 62, 60, 58, 69 and 78 more efficiently transmits the power from the C-shaped arm 28 to the forward and intermediate outriggers 74 and 66 than if the power is transmitted directly through the C-shaped arms 28.

The system of top links and levers as a whole is disclosed and claimed in the co-pending Westrope application, Serial No. 421,097, filed December 1, 1941. The present invention enables a more efficient utilization of power in lifting a top of the type shown in this Westrope application, but it may obviously be used with other types of tops which are also pivotally mounted upon vehicle bodies.

While a specific embodiment of the invention has been described and illustrated, it will be understood that various modifications may be made within the scope of the appended claims without departing from the spirit of the invention.

What I claim is:

1. In a foldable top structure for a vehicle body with windows and a windshield, a rear top frame member having a lever portion pivoted to said body and an arcuately curved frame portion extending angularly therefrom, a system of top frame members operatively connected to the frame portion of said rear top frame member, a swingable arm mounted adjacent said rear top frame member upon a pivot independent and forwardly thereof, means interconnecting said arm and the frame portion of said rear frame member to swing rearwardly of said lever portion pivot, and power-operated lifting mechanism operatively interconnected to said arm to exert a force on said frame portion about an arc rearwardly of said lever portion pivot.

2. In a foldable top structure for a vehicle body with windows and a windshield, a rear top frame member having a lever portion pivoted to said body and an arcuately curved frame portion extending angularly therefrom, a system of top frame members operatively connected to the frame portion of said rear top frame member, a swingable arm mounted adjacent said rear top frame member upon a pivot independent and forwardly thereof, means interconnecting said arm and the frame portion of said rear frame member to swing rearwardly of said lever portion pivot, and a power-operated lifting device pivotally mounted on said body and operatively connected to said arm to exert a force on said frame portion about an arc rearwardly of said lever portion pivot.

3. In a foldable top structure for a vehicle body with windows and a windshield, a rear top frame member having a lever portion pivoted to said body and an arcuately curved frame portion extending angularly therefrom, a system of top frame members operatively connected to the frame portion of said rear top frame member, a swingable arm mounted adjacent said rear top frame member upon a pivot independent and forwardly thereof, means interconnecting said arm and the frame portion of said rear frame member to swing rearwardly of said lever portion pivot, and a power-operated lifting device pivotally mounted on said body and operatively connected to said arm near the outer end thereof to exert a force on said frame portion about an arc rearwardly of said lever portion pivot.

4. In a foldable top structure for a vehicle body with windows and a windshield, a rear top frame member having a lever portion pivoted to said body and an arcuately curved frame portion extending angularly therefrom, a system of top frame members operatively connected to the frame portion of said rear top frame member, a swingable arm mounted adjacent said rear top frame member upon a pivot independent and forwardly thereof, means interconnecting said arm and the frame portion of said rear frame member to swing rearwardly of said lever portion pivot, and a power-operated lifting device pivotally mounted on said body and operatively connected to said arm near the outer end thereof adjacent said interconnecting means to exert a force on said frame portion about an arc rearwardly of said lever portion pivot.

5. In a foldable top structure for a vehicle body with windows and a windshield, a rear top frame member having a lever portion pivoted to said body and an arcuately curved frame portion extending angularly therefrom, a system of top frame members operatively connected to the frame portion of said rear top frame member, a swingable arm mounted adjacent said rear top frame member upon a pivot independent and forwardly thereof, a link pivotally connecting said arm with the frame portion of said rear frame member to swing rearwardly of said lever portion pivot, and power-operated lifting mechanism operatively connected to said arm to exert a force on said frame portion about an arc rearwardly of said lever portion pivot.

6. In a foldable top structure for a vehicle body with windows and a windshield, a rear top frame member having a lever portion pivoted to said body and an arcuately curved frame portion extending angularly therefrom, a system of top frame members operatively connected to the frame portion of said rear top frame member, a swingable arm mounted adjacent said rear top frame member upon a pivot independent and forwardly thereof, a link pivotally connecting said arm with the frame portion of said rear frame member to swing rearwardly of said lever portion pivot, and power-operated lifting mechanism operatively connected to said arm, near the pivotal connection thereof with said link to exert a force on said frame portion about an arc rearwardly of said lever portion pivot.

7. In a foldable top structure for a vehicle body with windows and a windshield, a rear top frame member having a lever portion pivoted to said body and an arcuately curved frame portion extending angularly therefrom, a system of top frame members operatively connected to the frame portion of said rear top frame member, a swingable arm mounted adjacent said rear top frame member upon a pivot independent and forwardly thereof, a link pivotally connecting said arm with the frame portion of said rear frame member to swing rearwardly of said lever portion pivot, and power-operated lifting mechanism operatively connected to said arm, and pivotally mounted on said body to exert a force on said frame portion about an arc rearwardly of said lever portion pivot.

8. In a foldable top structure for a vehicle body with windows and a windshield, a rear top frame member having a lever portion pivoted to said body and an arcuately curved frame portion extending angularly therefrom, a system of top frame members operatively connected to the frame portion of said rear top frame member, a swingable arm mounted adjacent said rear top frame member upon a pivot independent and forwardly thereof, means interconnecting said arm and the frame portion of said rear frame member to swing rearwardly of said lever portion pivot, and a power-operated lifting device having a screw shaft with a traveling nut thereon pivotally connected to said arm to exert a force on said frame portion about an arc rearwardly of said lever portion pivot.

9. In a foldable top structure for a vehicle body with windows and a windshield, a rear top frame member having a lever portion pivoted to said body and an arcuately curved frame portion extending angularly therefrom, a system of top frame members operatively connected to the frame portion of said rear top frame member, a swingable arm mounted adjacent said rear top frame member upon a pivot independent and forwardly thereof, a link pivotally connecting said arm with the frame portion of said rear frame member to swing rearwardly of said lever portion pivot, and a power-operated lifting device having a screw shaft with a traveling nut thereon pivotally connected to said arm to exert a force on said frame portion about an arc rearwardly of said lever portion pivot.

10. In a foldable top structure for a vehicle body with windows and a windshield, a rear top frame member having a lever portion pivoted to said body and an arcuately curved frame portion extending angularly therefrom, a system of top frame members operatively connected to the frame portion of said rear top frame member, a swingable arm mounted adjacent said rear top frame member upon a pivot independent and forwardly thereof, a link pivotally connecting said arm with the frame portion of said rear frame member to swing rearwardly of said lever portion pivot, and a power-operated lifting device having a screw shaft with a traveling nut thereon pivotally connected to said arm near the pivotal connection thereof with said link to exert a force on said frame portion about an arc rearwardly of said lever portion pivot.

WALTER P. LEVON.